United States Patent [19]

Cohen

[11] Patent Number: 5,014,182
[45] Date of Patent: May 7, 1991

[54] HIGH FREQUENCY SELF-OSCILLATING INVERTER WITH NEGLIGIBLE SWITCHING LOSSES

[75] Inventor: Itzchak Cohen, Dix Hills, N.Y.

[73] Assignee: Lambda Electronics Inc., Melville, N.Y.

[21] Appl. No.: 340,279

[22] Filed: Apr. 19, 1989

[51] Int. Cl.$^5$ .......................................... H02M 7/5383
[52] U.S. Cl. ..................... 363/132; 363/22; 363/17; 363/133
[58] Field of Search ..................... 363/55, 56, 98, 131, 363/132, 133, 22, 23

[56] References Cited

U.S. PATENT DOCUMENTS

| | | | |
|---|---|---|---|
| 4,334,267 | 6/1982 | Miko | 363/133 |
| 4,336,587 | 6/1982 | Boettcher, Jr. et al. | 363/134 |
| 4,403,269 | 9/1983 | Carroll | 361/91 |
| 4,489,373 | 12/1984 | du Parc | 363/56 |
| 4,504,895 | 3/1985 | Steigerwald | 363/132 |
| 4,561,046 | 12/1985 | Kuster | 363/21 |
| 4,607,322 | 8/1986 | Henderson | 363/56 |
| 4,628,284 | 12/1986 | Bruning et al. | 363/22 |
| 4,639,849 | 1/1987 | Noworolski et al. | 363/56 |
| 4,758,940 | 7/1988 | Steigerwald | 363/98 |
| 4,833,584 | 5/1989 | Divan | 363/132 |

FOREIGN PATENT DOCUMENTS 0265570 11/1988 Japan.
2071950 9/1981 United Kingdom ................ 363/132

OTHER PUBLICATIONS

Patterson et al., "Pseudo-Resonant Full Bridge DC/DC Converter", 18th Annual IEEE PESC Record, Blacksburg, Va., Jun. 21-26, 1987, pp. 424-428.

Primary Examiner—Peter S. Wong
Attorney, Agent, or Firm—Morgan & Finnegan

[57] ABSTRACT

A high frequency self-oscillating inverter including a snubber circuit for minimizing both turn-on and turn-off switching losses. The inverter converts a DC supply to an AC load current and includes a saturating transformer for alternatively driving first and second switching devices during subsequent unsaturated states. During the time the transformer is saturated, both switching devices are kept off.

The snubber circuit includes a first capacitor across the first switching device, a second capacitor across the second switching device, and an inductance. During saturation the two capacitors and inductance form a resonance circuit, wherein the inductance has a resonant half sine wave current, one capacitor discharges, and the other capacitor charges.

Turn off switching losses are made negligible by selecting capacitors such that the fall time of the corresponding switching device is much faster than the time to charge the capacitor to a significant voltage.

Turn on switching losses are made negligible by having the capacitor across the on-going switching device discharge to approximately zero during saturation before the transformer returns to an unsaturated state to turn-on the on-going switching device.

6 Claims, 4 Drawing Sheets

HIGH FREQUENCY SELF-OSCILLATING INVERTER WITH NEGLIGIBLE SWITCHING LOSSES

Technical Field

This invention relates to high frequency inverter and converter circuits. More particularly, this invention relates to high frequency inverter and converter circuits including snubber circuits for eliminating switching losses.

BACKGROUND OF THE INVENTION

In general, transistor switches in inverters and converters operating at high frequencies consume power when switching on and off. The power consumption, referred to as power losses, switching losses or turn-on and turn-off losses, arises from the presence of both current through the switch and voltage across the switch during the "turn-on" and "turn-off" processes.

Most inverter/converter loads are inductive in nature. Because the rise rate of an inductive load current is slow, the voltage across the switching device will drop nearly to zero before the current through the switch can reach a significant value. As a result, the power losses during the turn-on period are insignificant.

The power losses during the turn-off period, however, are more significant. As the switching device begins turning off, the inductive load causes a rapid change in current which produces a rapid increase in voltage across the switch subjecting the switching device to high power levels.

To reduce switching losses snubber circuits have been used. A snubber circuit is a capacitor connected across the switching device to reduce turn-off losses. Such a connection delays the voltage rise across the switching device during the turn-off process for the time the capacitor is being charged by the load current. By choosing a capacitor of sufficiently large capacitance, the voltage rise can be maintained at a low level during the decay time resulting in negligible power losses during the turn-off period.

One of the drawbacks of such a snubber circuit is that while turn-off loss is greatly reduced, the circuit will introduce severe turn-on losses and possibly subject the switch to damage as the energy stored in the capacitor dissipates through the switching device during the turn-on period.

In addition to capacitors, snubber circuits also may include diodes, resistors, or inductors. While there are a variety of snubber circuits in existence they generally can be classified as either dissipative or non-dissipative snubber circuits A dissipative snubber circuit consists of a snubbing capacitor, a resistor which limits the capacitor discharge current during the turn-on period, and a diode that isolates the capacitor from the switch during turn-on. As previously described this type of circuit increases turn-on losses, merely diverting the turn-off loss from the switching device to the snubber resistor.

A non-dissipative snubber circuit is considerably more complex and reduces the switching losses by (1) returning the energy that is stored in the snubber capacitor during turn-off to the input source or (2) diverting the energy to the load. Such circuits generally include inductors in addition to diodes and capacitors. While providing lower losses than the dissipative snubber, the non-dissipative snubber does not eliminate losses associated with the discharge of the output capacitance of the switching devices.

Thus, while there are snubber circuits that reduce or divert turn-off losses to a negligible amount, there is a need for a snubber circuit that can reduce both the turn-on losses and the turn-off losses to a negligible amount.

SUMMARY OF THE INVENTION

It is an object of this invention to provide a snubber circuit which minimizes turn-off and turn-on losses for switching devices in self oscillating inverter and converter circuits and does so under load conditions ranging from full load to no load for inductive and non-inductive loads.

These and other objects of the invention are accomplished for a high frequency self-oscillating inverter by a snubber circuit including respective capacitors connected across respective switching devices of the inverter and an inductor configured to form with the capacitors a resonant oscillatory circuit during the saturation states of a transformer of the inverter.

In the self-oscillating inverter two switching devices are driven at a 180° phase difference so that when one switch is on the other switch is off. The snubber circuit of this invention functioning as a resonant oscillatory circuit provides a dead time in between the conduction periods of the switching devices. A dead time occurs each time a switching device turns off. During this dead time the snubbing capacitors in effect exchange their voltage levels as one capacitor discharges and the other capacitor charges. When the dead time ends and the switching on of one switching device occurs, the voltage across the capacitor snubbing that on-going switch is already at or near the zero level, providing an essentially loss free turn on.

Additional optimization is achieved by selecting capacitances for the capacitors across the switching devices which are a function of the fall time of the switching devices so that the current through the switching devices decays rapidly before the voltages ($V_{DS}$) across the switching devices and snubbing capacitors rise to a significant level. This reduces turn-off losses to a negligible amount.

DETAILED DESCRIPTION OF THE PREFERRED EMBODIMENTS

Figure 1:
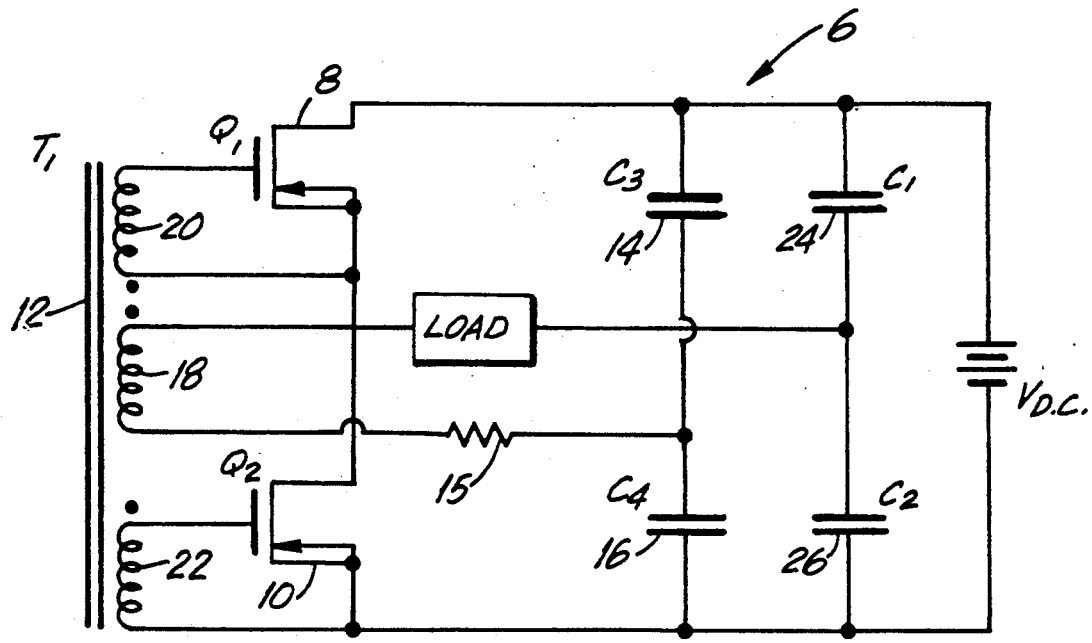
FIG. 1 is a prior art half bridge circuit known as a Jensen oscillator.

FIG. 1 illustrates an un-snubbed circuit 6 in a half bridge configuration referred to as a Jensen-type oscillator. The circuit 6 includes switching transistors 8 and 10, drive transformer 12, current limiting resistor 15, and capacitive dividers 14, 16 and 24, 26. Drive transformer 12 includes a primary winding 18 and two secondary winding 20, 22. The circuit of FIG. 1 operates as follows:

The voltage across the primary winding 18 of drive transformer 12 is stepped down by the secondary winding 20 to a level sufficient to drive transistor 8 into an "on" condition. The core of transformer 12, however, saturates after a period of time T/2, effectively short circuiting the gate of transistor 8, causing the transistor to rapidly turn-off. When transistor 8 turns off, current flow to the primary winding 18 of transformer 12 is interrupted, causing the voltage on all windings to reverse. As a result, secondary winding 22 steps down the voltage across the primary winding 18 to drive transistor 10 into an "on" condition. After another interval T/2, transformer 12 is again saturated, reversing the voltage across the windings causing transistor 10 to turn-off and transistor 8 to turn-on. Transistors 8 and 10 iteratively switch on and off, being driven at a 180° phase difference so as to produce a sustained oscillation with a square wave voltage having an amplitude of $V_{D.C.}/2$ and period T which can be applied to a load.

While transformer 12 is saturated all three windings are short-circuited. Resistor 15 is connected in series with the primary winding 18 to limit the current during such saturation.

The oscillation circuit 6 has significant switching losses. Losses are introduced by current pulses flowing through resistor 15 when drive transformer 12 is saturated. This loss may be very significant at high operating frequencies where the saturation period is relatively long in comparison to the oscillation period.

Figure 2:
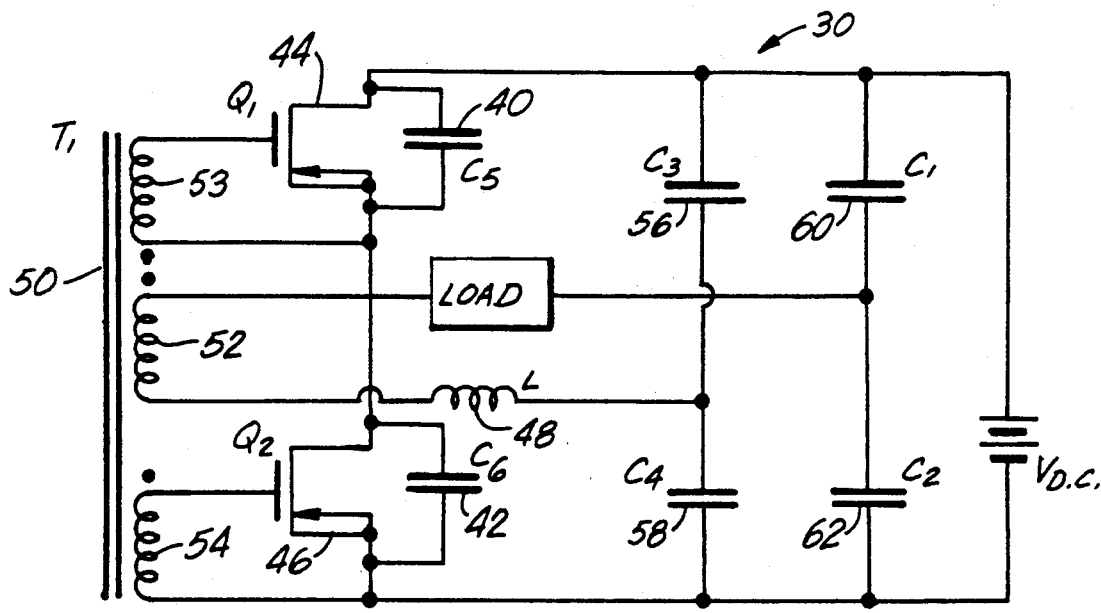
FIG. 2 is a half bridge configuration of the present invention.

Referring to FIG. 2, the snubber circuit of this invention is added to the circuit of FIG. 1 to form a snubbed self-oscillating inverter circuit 30. The snubber circuit includes capacitors 40 and 42 connected across switching transistors 44 and 46, respectively, and an inductor 48 which replaces resistor 15. Inductor 48 is selected to have an inductance value significantly lower than the magnetizing inductance of transformer 50. Ideally all the voltage applied to the inductor 48 and primary winding 52 would be dropped across the primary winding 52 while the transformer 50 is unsaturated. When saturated, ideally, all the voltage drop would be across inductor 48. In practice, however, most rather than all the voltage drop is across inductor 48 during saturation.

Under a no load condition, the circuit operates as follows generating the waveforms in FIGS. 3a–d:

The voltage across primary winding 52 is stepped down by secondary windings 53, 54 to turn either transistor 44 or 46 on depending on the polarity of the voltage in the windings. After a time interval, T/2, the transformer is saturated, in effect shorting the windings 52, 53, 54.

Figure 3A:
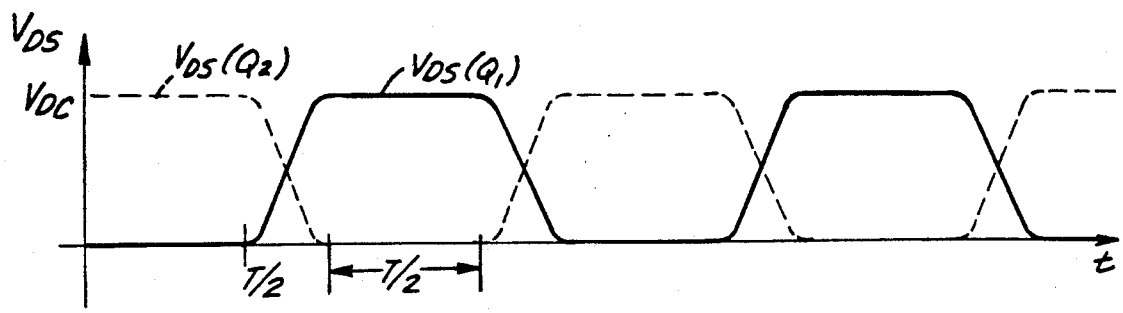
FIG. 3 is a graph depicting waveforms for the circuit of FIG. 2.
Figure 3B:
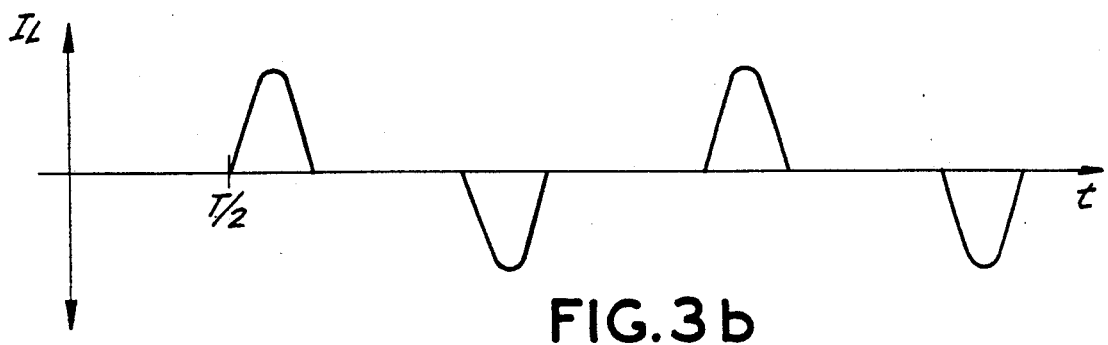
Figure 3C:
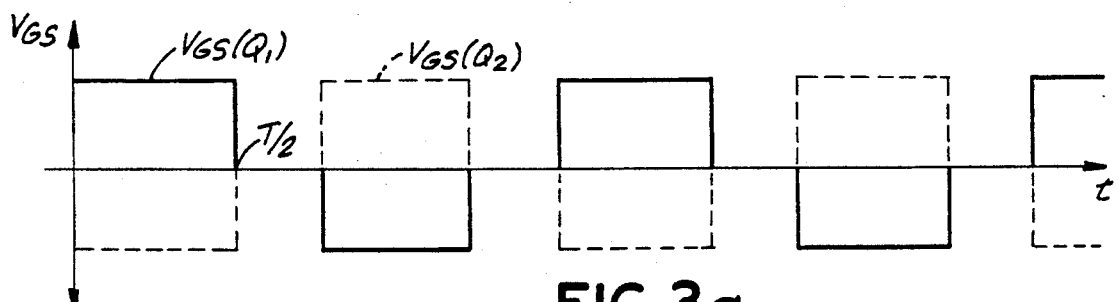
Figure 3D:
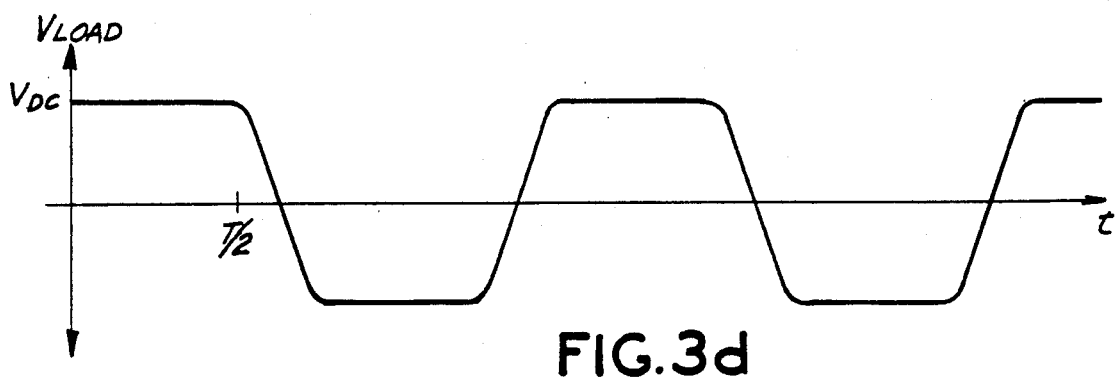
Figure 4A:
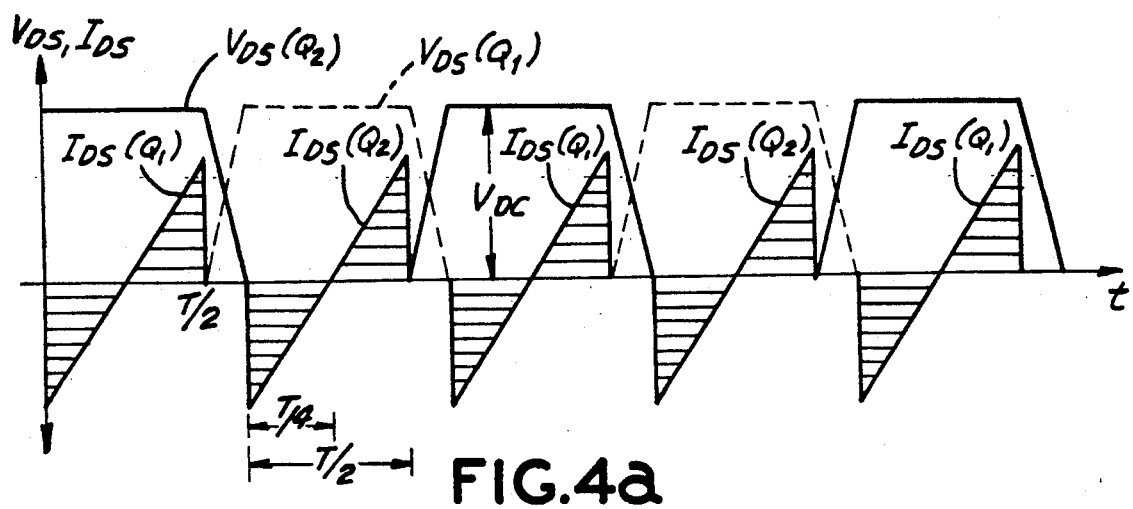
FIG. 4 is a graph depicting waveforms for a purely inductive load for the circuit of FIG. 2.
Figure 4B:
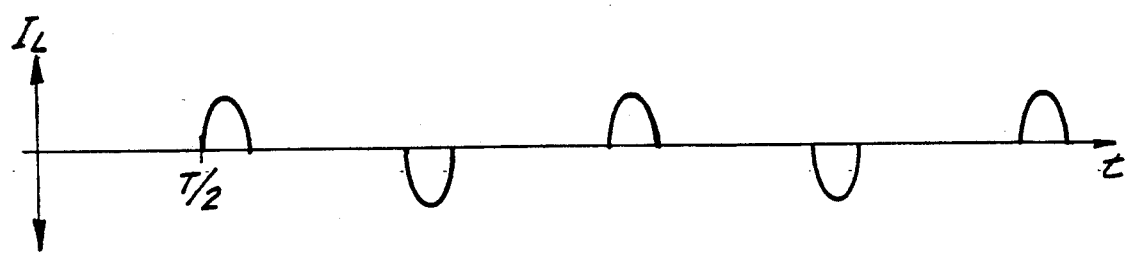
Figure 4C:
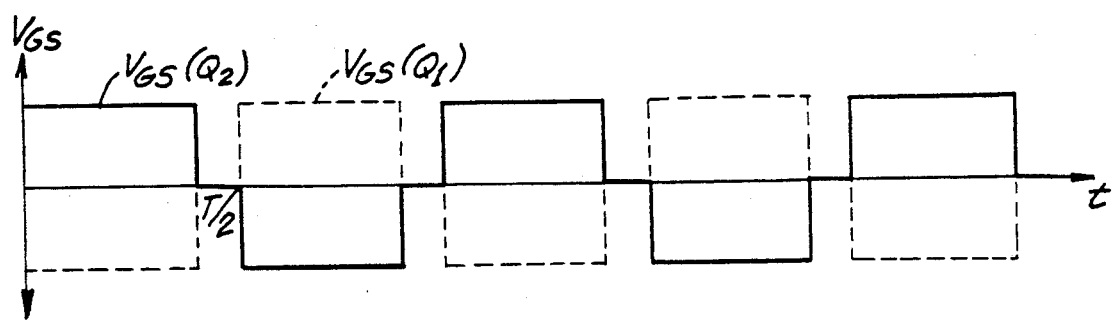
Figure 4D:
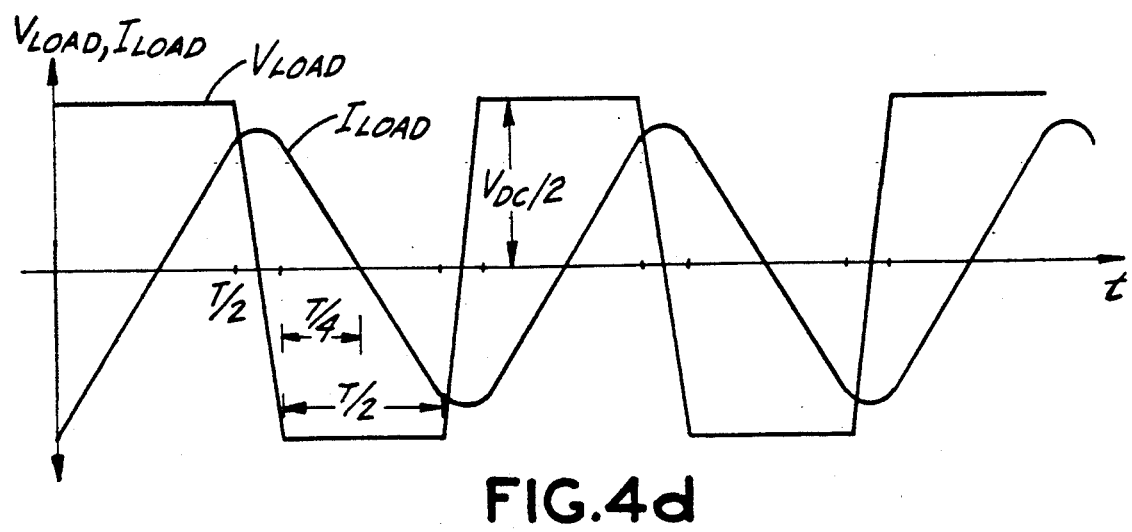

When $Q_1$, transistor 44, is "on", the voltage across capacitor 40 (equal to $V_{DS}(Q_1)$ in FIG. 3a) is approximately zero and the voltage across capacitor 42 (equal to $V_{DS}(Q_2)$ in FIG. 3a) is approximately $V_{DC}$. At the following saturation point (shown in FIG. 3a as time T/2), secondary winding 53 will short the gate of transistor 44 to its source, so that $V_{GS}(Q_1)$ (see FIG. 3c) is zero. In addition secondary winding 54 will short the gate of $Q_2$, transistor 46, to its respective source, so that $V_{GS}(Q_2)$ is zero (see FIG. 3C). In effect $Q_1$, transistor 44, is turned off and $Q_2$, transistor 46 remains off.

When saturation occurs the inductor 48 and capacitors 40 and 42 form a resonant circuit. When the resonant circuit becomes active, the current through inductor 48 begins to increase (see $I_L$ of FIG. 3b), capacitor 42 begins to discharge to zero (see $V_{DS}(Q_2)$ of FIG. 3a) and capacitor 40 begins to charge to $V_{DC}$ (see $V_{DS}(Q_1)$ of FIG. 3a).

When the voltage across capacitors 40, 42 reach equal levels, $V_{DC}/2$, the current, $I_L$, through inductor 48 begins to decrease The resonant half sine wave of current, $I_L$, (see FIG. 3b) maintains transformer 50 in saturation avoiding turn-on of $Q_2$, transistor 46.

The inductor current, $I_L$, decreases to zero and would tend to reverse as characteristic of the oscillation of the resonant circuit, however, when the current in the primary winding 52 reverses, the transformer 50 comes out of saturation. At this point capacitor 42 has discharged, and capacitor 40 has charged. The secondary winding 54 steps down the voltage across the primary winding 52 to turn-on $Q_2$, transistor 46. Referring to FIG. 3a, this condition is shown where $V_{DS}(Q_2)$ is approximately zero and $V_{DS}(Q_1)$ is approximately $V_{DC}$.

After another time interval, T/2, transformer 50 saturates in the opposite direction reactivating the resonant circuit. Capacitor 40 now discharges while capacitor 42 charges and the resonant half sine wave of current $I_L$ is in the opposite direction. The cycle continuously repeats switching transistors 44 and 46 on and off. As already mentioned, during substantially all the saturation time period both transistors 4 and 46 are off. This time period is referred to as "dead time."

The "dead time" is equal to half the period of the resonant circuit formed by inductor 48 and capacitors 40 and 42. The "dead time" is represented as $T_R/2$ and defined below in formula (1):

$$T_R/2 = \pi(L(C_5+C_6))^{.5} \quad (1)$$

where
L = inductance of inductor 48
$C_5$ = capacitance of capacitor 40
$C_6$ = capacitance of capacitor 42

The "dead time" allows the voltage across the transistors 44, 46 to go to zero before either of the transistors turn-on. As a result, the transistors will have substantially zero turn-on switching losses because the voltage across each during turn-on is approximately zero.

Turn off losses can be made negligible by selecting the capacitance, $C_5$, for capacitor 40 and the capacitance, $C_6$, for capacitor 42 such that:

$$V_{DC}(C_5+C_5)/I_{LOAD} >> t_{fall} \quad (2)$$

where
$I_{LOAD}$ = load current
$t_{fall}$ = fall time of switching transistors 44, 46

The current fall times for circuit 30 of FIG. 2 are very short, typically, 20 to 50 nanoseconds. Therefore, moderate capacitance values can be chosen for capacitors 40 and 42 to comply with equation (2).

Under a purely inductive load condition the circuit 30 generates the waveforms of FIGS. 4a–d.

The voltage $V_{DS}$ rise rate (see FIG. 4a) across $Q_1$ (transistor 44) and $Q_2$ (transistor 46) is considerably faster than for the no load condition previously described (compare FIG. 3a). For clarity, the transition periods in FIGS. 3 and 4 are exaggerated.

At a time T/2, the transformer 50 saturates and $Q_1$, transistor 44, turns off. The turn-off loss is negligible by satisfying formula (2). The resonant circuit previously described causes inductor 48 current, $I_L$, to increase, capacitor 40 to begin discharging to zero (see $V_{DS}(Q_1)$), and capacitor 42 to begin charging to $V_{DC}$ (see $V_{DS}$ (Q$_2$)). Note that the resonant half sine wave of current, $I_L$, (see FIG. 4b) is shorter than for the no load condition (compare FIG. 3b), and thus that the "dead time" also is shorter.

When the voltage across Q$_1$, transistor 44, reaches $V_{D.C.}$ and the voltage across Q$_2$, transistor 46, drops to zero, the load current, $I_{LOAD}$, will start flowing through a body diode of Q$_2$ back into the source $V_{D.C.}$. The body diode is a drain-to-substrate diode which is usually cut off when the transistor is operating in a normal condition. Depending on the embodiment the diodes may be part of the transistors 44, 46 or may be external diodes connected across the drain and substrate of the respective transistors. As the transformer 50 comes out of saturation, a voltage induced in secondary winding 54 will be applied across the gate of Q$_2$, transistor 46. The transistor 46 then starts conducting in the reverse direction, diverting the current from the body diode of transistor 46. Depending on the transistor characteristics and the value of the load current, all or part of the current flowing through the body diode of the transistor 46 may be diverted. During the turn-on period, the switching loss is substantially zero as the voltage across capacitor 42 will be approximately zero. After a time, T/4, the load current, $I_{LOAD}$, reverses (see FIG. 4d) and the transistor 46 starts conducting in the normal direction (see $I_{DS}$ (Q$_2$) of FIG. 4a).

After an additional time, T/4, the transformer 50 saturates in the opposite direction causing Q$_1$ to turn-off. After the ensuing dead time Q$_2$ then turns on. The cycle continuously repeats switching Q$_1$ and Q$_2$ on and off at a 180° phase difference with a dead time between switching one transistor off and the other transistor on where both transistors are off.

The turn-off loss, $P_{off}$, may be represented by formula 3:

$$P_{off} = f \times I_{LOAD}/2 \times V_{DS}/2 \times t_{fall} \quad (3)$$

where
f = operating frequency
$I_{LOAD}$ = load current
$V_{DS}$ = voltage across snubbing capacitor during the fall time
$t_{fall}$ = drain current fall time For a 200 watt converter operating at 300 KHz from a 300 V DC source, a typical value for the inductor and two snubbing capacitors may be:
Inductor 48 = 110 uH
Capacitor 40 = Capacitor 42 = 1500pF
Typical fall and rise times for the switching transistors 44, 46 are:
Drain current fall time from
3 amperes to zero = 30 nsec
Drain voltage rise time
(at 3 amp drain current) = 0.3 usec.
For the exemplary specifications, the turn-off loss is:

$$P_{off} = 300 \text{ KHz} \times 3 \text{ A}/2 \times 30 \text{ V}/2 \times 30 \text{ nsec.}$$
$$= 202 \text{ mWatts}$$

This power loss is negligible in relation to the 200 watt output of the inverter.

Figure 5:
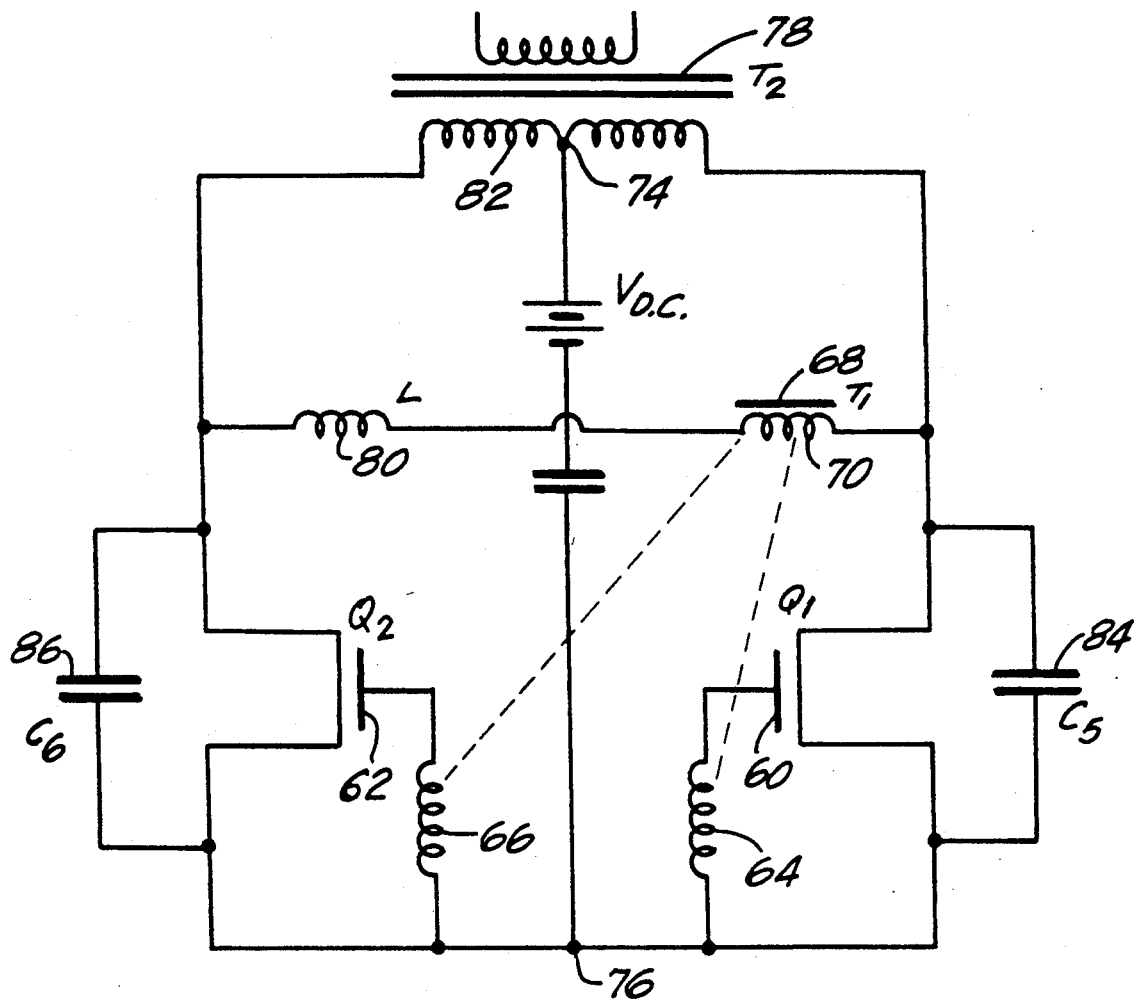
FIG. 5 is a push-pull configuration of the present invention.

A push-pull configuration of this invention is shown in FIG. 5. Switching transistors 60 and 62 are connected in a push-pull arrangement to respective secondary windings 64, 66 of a power transformer 68 having a primary winding 70. A DC voltage source $V_{D.C.}$ is coupled between a center tap of a primary terminal 74 and a current return terminal 76 of transformer 78 (T$_2$). An inductor 80 is coupled between the primary winding 70 of T$_1$, primary winding 82 of T$_2$ and switching transistor 62. The snubbing capacitors 84 and 86 are coupled across the transistors 60 and 62, respectively.

The snubber circuit includes the capacitors 84 and 86 and the inductor 80. The capacitors 84, 86 are selected in accordance with equation (2) so that turn-off losses are negligible. The snubber circuit acts as a resonant oscillation circuit during saturation of T$_1$, transformer 68, to provide a dead time during which both transistors 60, 62 are off. As a result, the voltage across the capacitor which is connected across the on-going transistor will be approximately zero at turn-on so that turn-on losses are negligible.

While preferred embodiments of the invention have been illustrated and described, the invention is not intended to be limited to the exact embodiments illustrated. For example, although half-bridge and push-pull configurations have been described other configurations and double-ended configurations such as a full-bridge configuration may embody the invention.

I claim:

1. A high frequency self oscillating inverter having a low switching loss characteristic, said inverter comprising:
    (1) a source of d.c. power;
    (2) a load circuit;
    (3) a switching circuit between said source and said load for supplying alternating current to said load circuit; said switching circuit including:
        (a) first and second switching devices for alternately switching said alternating current, said devices being alternately switched to a conductive state separated by a dead period when neither is conductive;
    (4) a snubber circuit associated with said switching circuit for reducing both turn-on and turn-off switching losses, said snubber circuit comprising a resonant circuit which includes:
        (a) first and second snubber capacitance means respectively shunting said first and second switching devices;
        (b) resonating inductance for forming with said snubber capacitance means, said resonant circuit;
        (c) means for effectively disabling said resonant circuit except for dead periods between the conduction times of said first and second switching devices, whereby a voltage level exchange between said snubber capacitances means occurs during said dead periods.

2. A high frequency self oscillating inverter having a low switching loss characteristic, said inverter comprising;
    (1) a source of d.c. power;
    (2) a load circuit;
    (3) a switching circuit between said source and said load for supplying alternating current to said load circuit; said switching circuit including:
        (a) alternately conductive first and second switching devices for switching said alternating current;
        (b) commutating means in circuit with said devices for alternately switching said devices;

(4) a snubber circuit associated with said switching circuit for reducing both turn-on and turn-off switching losses, said snubber circuit comprising:
  (a) first and second snubber capacitance means respectively shunting said first and second switching devices;
  (b) resonating inductance for forming with said snubber capacitance means, a resonant circuit having a resonant frequency higher than the operating frequency of the inverter, said resonant circuit being configured to exchange the voltage levels across said first and second snubber capacitance means;
  (c) means for effectively disabling said resonant circuit except for dead time transition periods between the conduction times of said first and second switching devices, whereby said voltage level exchange occurs during said dead time transitions.

3. An inverter as defined in claim 2 wherein said commutating means comprises a saturable transformer.

4. An inverter according to claims 1 or 2 wherein the period of said resonant frequency is approximately twice said dead time period.

5. An inverter according to any of claims 1 or 2 in which the capacitance of said first and second snubber capacitance means have an aggregate value which is substantially larger than the product of the load current and the fall time of the switching devices, divided by the d.c. source voltage.

6. An inverter according to claims 1 or 2 in which said resonant circuit includes saturable inductance for disabling said resonant circuit during conduction periods.

* * * * *